(No Model.) 2 Sheets—Sheet 2.

A. C. BOWEN.
AMALGAMATOR.

No. 271,305. Patented Jan. 30, 1883.

Witnesses,
Geo. H. Strong.
J. H. Rouse.

Inventor,
A. C. Bowen
By Dewey & Co.
Attorneys

UNITED STATES PATENT OFFICE.

AUGUSTUS C. BOWEN, OF MICHIGAN BLUFF, CALIFORNIA.

AMALGAMATOR.

SPECIFICATION forming part of Letters Patent No. 271,305, dated January 30, 1883.

Application filed September 8, 1882. (No model.)

*To all whom it may concern:*

Be it known that I, AUGUSTUS C. BOWEN, of Michigan Bluff, county of Placer, State of California, have invented an Improved Amalgamator; and I hereby declare the following to be a full, clear, and exact description thereof.

My invention relates to a novel apparatus which I call a "disintegrator and amalgamator;" and it consists in certain combinations and arrangements of elements, as hereinafter fully described, and specifically pointed out in the claim.

Figure 1:
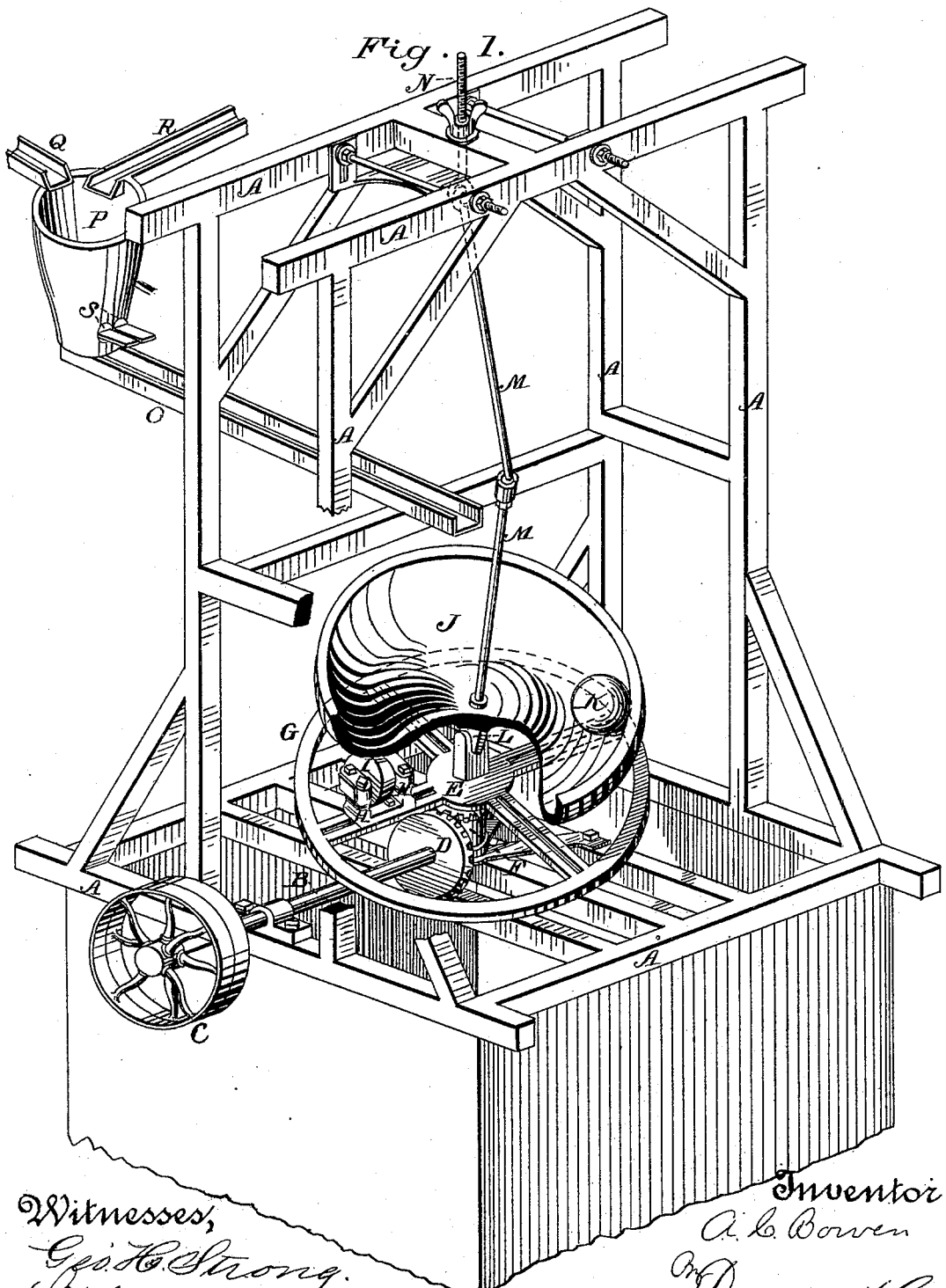
Figure 2:
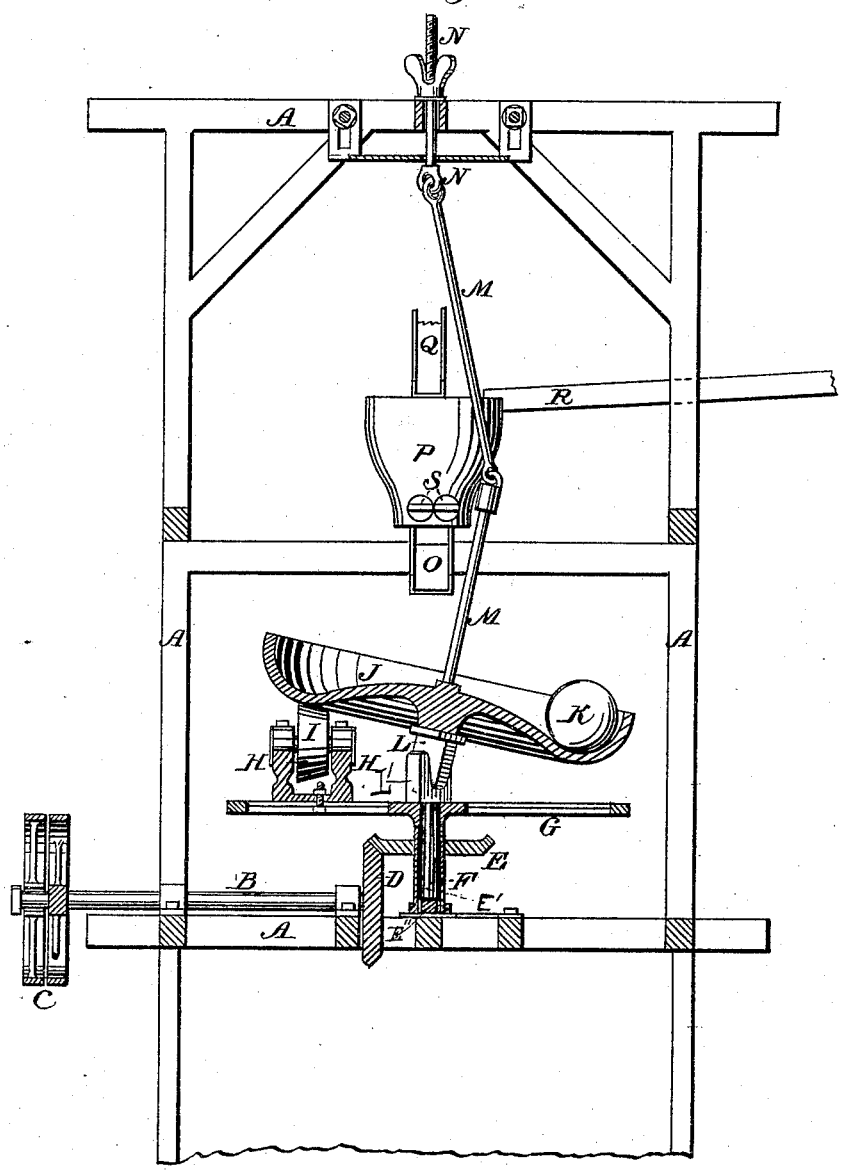
Figure 3:
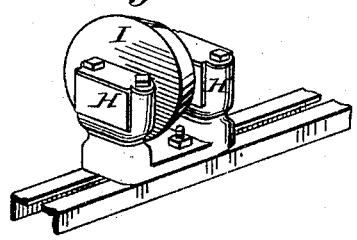

Referring to the accompanying drawings for a more complete explanation of my invention, Figure 1 is a perspective view of my apparatus. Fig. 2 is a sectional elevation of the pan and driving-gear. Fig. 3 is an enlarged view of the roller which supports the edge of the pan. Fig. 4 is a section of the tub P.

A is the frame-work upon which my apparatus is supported, and B is a horizontal driving-shaft, with fast and loose pulleys C upon the outer end, and a bevel-gear, D, upon the inner end, to engage a similar gear, E, which is fixed to a vertical sleeve, F. Upon this sleeve-shaft F is secured a horizontal wheel, G, with slotted arms, and upon one of these arms is a standard, H, between the uprights of which a beveled pulley or roller, I, revolves.

The pan J is made with a curved concave interior, the outer portion of which is slightly depressed to form a channel for a ball, K, to travel in. The pan may be centrally supported by a ball-and-socket joint, so as to permit a universal movement around it; but as such a joint is liable to wear flat in time I have made an equivalent universal joint by means of a stem, L, projecting downward from the center of the pan and flattened at its lower end. This end is forked and fits a similar loose fork, L', upon the upper end of the vertical shaft E', as shown, which passes down through sleeve F and has a bearing on step E''', so that it does not turn with sleeve F. The forked ends, which come together, may be made detachable from the shafts, so that when worn they may be easily replaced. The outer part of the pan J rests upon the beveled roller I, which is high enough to give the pan a considerable inclination to one side, and as the horizontal wheel or disk G is caused to rotate by the action of the bevel-gear below, it carries the roller I around beneath the rim of the pan, thus alternately lifting every portion of its periphery and giving it the rolling motion desired. The position of the roller beneath the pan may be changed, so as to increase or diminish the motion, by moving the standard H, upon which the roller is supported, to or from the center in the slot made in the arm of the wheel or disk upon which it is mounted.

From the center of the pan a jointed shaft, M, extends upward, and is jointed or connected by a link with an adjusting-screw, N, extending upward to the top of the frame-work, where it is operated by a nut or otherwise, so as to increase or diminish the meeting-angle at the joint in the rod. This jointed rod keeps the pan in place during its movements, and prevents its being upset during the rolling movement which is communicated to it by the roller beneath the edge of the pan. The material being then run into the pan J, while the latter is given its peculiar rolling or oscillating motion by means of the roller I and wheel G, the ball or balls K will roll down the inclined peripheral channel, so as to remain at or near the lowest point, and the material, together with the mercury which has been placed in the pan, will be thoroughly incorporated and amalgamated.

Having thus described my invention, what I claim as new, and desire to secure by Letters Patent, is—

The wheel G, journaled in a horizontal plane and carrying the vertically-journaled roller I, and means for rotating said wheel, in combination with the pan J, joint L, jointed shaft M, and adjusting-screw N, the whole supported in a suitable frame-work, for the purpose set forth.

In witness whereof I hereunto set my hand.

AUGUSTUS C. BOWEN.

Witnesses:
S. H. NOURSE,
H. B. APPLEWHAITE.